Aug. 5, 1952  J. R. ROGERS  2,606,312
DYNAMIC MOTOR BRAKING AND REVERSING CIRCUIT
Filed July 9, 1945
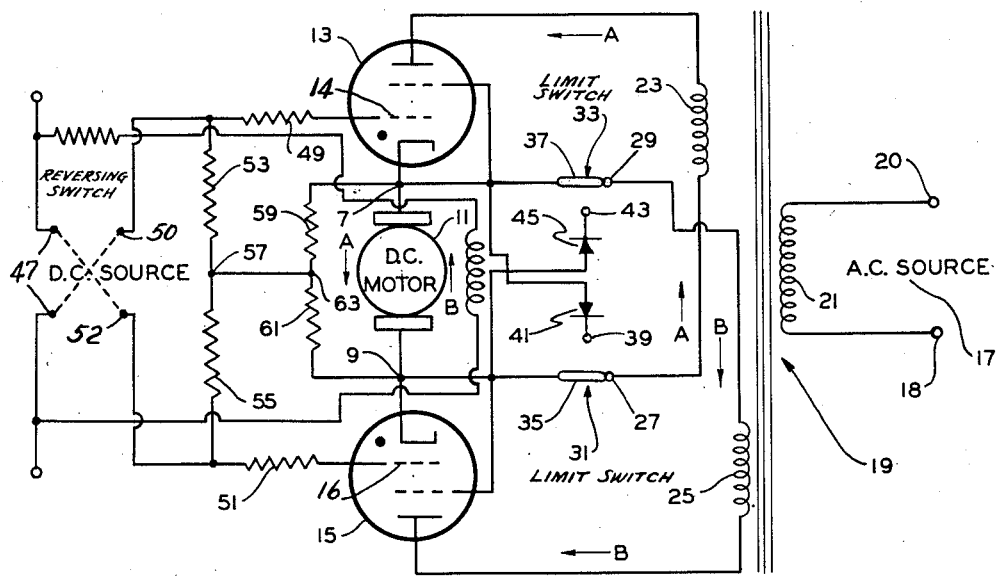
*INVENTOR.*
JOB R. ROGERS
BY
William D. Hall.
ATTORNEY Patented Aug. 5, 1952

2,606,312

UNITED STATES PATENT OFFICE 2,606,312

DYNAMIC MOTOR BRAKING AND REVERSING CIRCUIT

Job R. Rogers, Cambridge, Mass., assignor, by mesne assignments, to the United States of America as represented by the Secretary of War Application July 9, 1945, Serial No. 604,033

5 Claims. (Cl. 318—261)

1

This invention relates to improvements in motor control circuits, and more particularly to limit switching means for quickly stopping and changing the direction of rotation of direct current motors.

It is often desirable to reverse the direction of rotation of a direct current motor at desired points of rotation, so that the motor rotates little, if any, beyond the desired points of reversal. Such a situation occurs, for instance, in radar systems where it is desired to scan a certain predetermined sector in azimuth or elevation. It is, therefore, an object of the present invention to provide novel means applicable in limit switching systems of direct current motors which may be effected with a minimum of shaft rotation past the desired limit points.

A major object of the apparatus is to provide a quickly responsive and accurate device for dynamically braking motor rotation by shorting the armature circuit upon opening of an energizing circuit or reversal of its polarity so that instrumentalities which must be driven accurately without materially exceeding movement to a given angular position, may be so driven, and so that mechanical units associated therewith may not be damaged by overtravel.

It is a further object of the present invention to provide such means whereby direct current motors may, nevertheless, be reversed immediately with such stoppage at a predetermined limit.

It is a still further object of the present invention to provide such means whereby a direct current motor may be rotated in either direction and may be stopped and immediately reversed at any desired moment during such rotation in either of said directions, with equal exactitude of control.

It is a further object to provide such a limit switching means which may be adapted to motors of large as well as fractional ratings.

In general, the present invention resides in means for virtually short circuiting the armature of a direct current motor at any point of its rotation in either direction, such short circuit being unidirectional and effective only for counter electromotive force currents generated by rotation of the armature after opening of the motor-driving circuit, so that the motor may immediately be started rotating in the opposite direction by reversal of the motor operating current. Because of the unidirectional characteristic of the short circuit, such reversed current is not shunted out of the motor.

2

To the accomplishment of the foregoing general objects and such other more specific objects as hereinafter appear, the present invention consists in apparatus elements and their relation to one another, as hereinafter illustrated and described in the following specification and claimed in the appended claims. The specification is accompanied by a diagrammatic drawing showing a preferred circuit arrangement whereby the invention may be practiced.

As shown in the drawing, the armature terminals 7, 9 of a direct current reversible motor 11 are connected respectively to the cathodes of a pair of gas filled shield grid thyratrons 13, 15, such as of the 2050 type. The shield grids of said tubes 13, 15 are connected respectively to the cathodes thereof.

Alternating voltage is impressed upon the plates of the said tubes 13, 15, derived from an alternating current source 17 applied across primary terminals 18, 20 of a transformer 19, made up of a primary coil 21 and two secondary coils 23, 25.

The high potential motor-driving leads of the two secondary coils 23, 25 are connected respectively to the plates of tubes 13, 15; and the low potential return leads thereof are connected respectively to contacts 27, 29 of two single pole, double throw, braking switches 31, 33, which are both shown in their closed positions, although when the invention is utilized to stop the motor one of these switches will have an alternative position. The contact arms 35, 37 respectively of said switches 31, 33 are connected respectively to the terminals 9, 7 of the motor 11 aforementioned.

A second contact 39 of switch 31 is connected, through a selenium rectifier 41, to the terminal 7 of the motor 11 constituting a unidirectional conductor; and, similarly, a second contact 43 of switch 33 is connected, through a second selenium rectifier 45, to the terminal 9 of said motor 11, constituting a unidirectional conductor of opposite directional effect in series with the armature.

Direct current control voltages 47 are reversibly impressed upon the control grids 14—16 of the tubes 13, 15, for alternate operation of the tubes, by means of the resistors 49, 51, 53, 55, 59 and 61. Resistors 49 and 51 are interposed in the grid circuits of tubes 13, 15 respectively to limit grid current flow. Resistors 53 and 55, having the mutual terminal 57, are connected in series across the terminals 50, 52. Resistors 59 and 61, having the mutual terminal 63, are connected in series between the cathodes of the tubes 13, 15. The said mutual terminals 57, 63 are connected together. The last mentioned four resistors serve to permit grid leakage and to enable the establishment of a firing potential at the grids as required with a minimum flow of current from the D. C. source.

In the operation of the circuit just described and shown in the drawings, an alternating voltage 17 is impressed across the terminals 18, 20 and a direct current control voltage 47 is impressed across the terminals 50, 52. The direct current control voltage is such that the direct current potential on the control grids of the tubes 13, 15 will cause firing of one of the tubes and maintain cut off condition in the other. Assuming that the switch arms 35, 37 are in their normal positions, connected respectively to the contacts 27, 29 (as shown in the drawings), and that the direct current control voltage voltage is such that only tube 13 is conducting, the current flow in the circuit will be as indicated by the arrows A. A half wave rectified voltage will thus be impressed across the motor 11 and cause said motor 11 to run normally in a predetermined direction.

If the switch 31 is actuated (as by a cam (not illustrated), or manually, or in any other suitable manner, not illustrated) so that the contact arm 35, of switch 31, is swung from contact 27 to contact 39, shutting off the operating current applied to motor 11 through tube 13, a short circuit for the direction of current flow then manifest in the armature circuit will obtain across the armature of the motor 11 and rectifier 41, while an open circuit (or one closely approximating an open circuit) will be presented for the other or contrary direction of current flow in that same path, as the resistance through the dry type selenium rectifier 41 is very low in the one direction and is very high in the other. This short circuiting of the armature results in a current appearing in the armature circuit of opposite polarity from that derived through tube 13, and, in conjunction with the continued excitation of the field coil, results in a dynamic braking action on the motor, which very quickly stops the motor.

The motor 11 may forthwith be caused to rotate in the direction opposite to that in which it was previously rotating, by reversing the direct current control potential across the terminals 50, 52, which may be done by manual or other conventional means, so that only tube 15 is conducting. The energizing or operating current will then flow in the direction of the arrows B, thus reversing the direction of rotation of the motor 11. Because the rectifier 41 is nonconductive to currents flowing through tube 15, no shunt or shorting action takes place in spite of the fact that said rectifier is still shunted across the motor, and the high resistance of this rectifier is effective to prevent braking by generator (or "regenerating") action of the armature when it is driven in a reverse direction by an energizing circuit closed through the armature at the switch 31.

When it is desired to again reverse the motor, the contact arm 37 of switch 33 is swung from contact 29 to contact 43 (which, in the particular form illustrated may be assumed to be done manually), thereby connecting the rectifier 45 across the motor 11. Likewise, the switch 31 may be at the same time returned to its full line position as in the drawing, reestablishing the motor driving circuit A. Thus again the motor 11 is effectively short circuited, so as to cause a dynamic braking action in the opposite direction so that its direction of rotation may again be reversed by another reversal of the direct current control voltage across the terminals 50, 52.

While there has been described what is at present the best available embodiment of the invention as of the time of my application for patent, it will be obvious to those skilled in the art that various changes and modifications may be made therein without departing from the invention. For instance, the apparatus is not limited to the use of gas type rectifier tubes or to shield grid type Thyratrons. The use of regular Thyratrons or hard tubes is perfectly feasible. Again, it should be noted that the motor has been illustrated in the drawing of the apparatus in a purely schematic manner and while it has not been indicated therein that the motor is not self-excited, in actual practice the motor has been either of the type wherein the field was supplied by permanent magnets or a separately excited field used these practices being well understood in the art, and the alternative not requiring illustration herein.

What is claimed is:

1. A dynamic braking switching and motor reversing system for direct current motors comprising a reversible motor having an armature circuit and a constant field circuit, two normally open armature-shorting lines each including series means therein conductive in respective directions and effectively non-conductive in the respective contrary directions, two parallel alternately effective motor-driving power circuits of respective opposite current conducting directions each including said armature circuit in series therein, a source of direct current and means to reverse the same, means operatively associated therewith responsive to the direction of said direct current to control conduction in and for energizing of the said motor-driving circuits alternatively according to the polarity of said direct current, switch means in each said motor-driving circuit operable at will to open an energized one of the said motor-driving circuits and close the one said armature-shorting circuit effective with the braking current appearing at the moment in the armature, wherein when an energized one of said motor-driving circuits is opened and operation of the motor braked by the armature-shorting circuit, the motor is instantly responsive to energization by a reverse operating current from the other of said motor-driving circuits when said direct current is reversed.

2. A dynamic braking switching and motor reversing system for direct current motors, comprising a reversible motor having an armature circuit and a constant field circuit, at least one normally open armature-shorting line including series means therein effectively conductive in one rection only, two parallel alternately effective motor-driving power circuits of respective opposite current conducting directions each including said armature circuit in series therein, a source of direct current and means to reverse the same at will, means operatively associated therewith responsive to the direction of said direct current to control conduction in and for energizing of the said motor-driving circuits alternatively according to the polarity of said direct current, switch means in at least one said motor-driving circuit operable at will to open and close the same and constructed so that on opening it will close said armature-shorting line for utilization of braking current then manifest in the armature, the non-conductive nature of the said shorting line in the contrary direction thereupon permitting reverse operation of the motor by energization of the other of said motor-driving power circuits.

3. The structure of claim 2 wherein two said armature-shorting lines are provided in parallel and normally open, conductive in opposite directions in the motor when closed and at the same time open for currents in the respective contrary directions, and respective means cooperatively associated with each said motor-driving circuit and respective said shorting lines mutually in the operative relation stated, for alternative operation to open the effective motor operating circuit of the moment and close that one on said two armature-shorting lines then effective with the current generated in the armature for dynamic braking of the motor, and permitting immediate effective application of a reversing motor energizing current.

4. A dynamic braking switching and reversing means for a reversible direct current motor, comprising a first source of direct current, a first unidirectional conductor, a first switch means connected to a first terminal of the motor-energizing circuit, said switch means having two alternative conducting circuits from a second terminal of the motor-energizing circuit, one of said alternative circuits including the said first source of direct current and the other of said alternative circuits including the unidirectional conductor effective to conduct regenerated current through the motor-energizing circuit in a direction opposite the direction of current from said source of direct current through the motor; said switch means being operative at will to close said alternative conducting circuits alternatively in series with the motor energizing circuits; a second source of direct current, a second unidirectional conductor, a second switch means identical with the said first switch means connected to the second terminal of the motor-energizing circuit, and having two alternative conducting circuits from the first terminal of the motor-energizing circuit one of the last named alternative conducting circuits including the second source of direct current with polar relation at the motor the reverse of the relation of the first source of direct current to the motor, and the other of said last named alternative conducting circuits including the second unidirectional conductor effective to conduct regenerated current of the motor in a direction the opposite of that in which the said first unidirectional conductor is effective, said second switch means being operative at will to close said second named alternately conducting circuits alternatively to the motor, and separate means to open and close the said first and second direct current sources alternatively, so that one or the other will be effective, subject to operation of the said first and second switch means.

5. A dynamic braking switching means for a direct current reversible motor comprising two grid controlled gaseous discharge type tubes, the cathodes of which are connected to the opposite terminals of said motor; a reversible source of direct current control voltage impressed across the control grids of said tubes, a tank circuit between the grids and cathodes first and second discrete alternating potential circuits one being connected between the cathode of a first tube and the plate of a second tube and the second alternating current circuit being connected across the plate of the first tube and the cathode of the second tube; two motor-braking unidirectional conducting elements effective in opposite directions; switching means operable at will to disconnect one of the alternating current circuits from the motor and connect one of said unidirectional conducting elements across the motor; second switching means operable at will to disconnect the other of said alternating current circuits from the motor and connect the second unidirectional conducting element across the motor in the opposite direction and means to reverse polarity of said direct current control voltage.

JOB R. ROGERS.

REFERENCES CITED

The following references are of record in the file of this patent:

UNITED STATES PATENTS

| Number | Name | Date |
|---|---|---|
| 1,976,562 | Janisch | Oct. 9, 1934 |
| 2,167,530 | Schneider | July 25, 1939 |
| 2,264,333 | Satterlee | Dec. 2, 1941 |